(12) United States Patent
Linton

(10) Patent No.: US 12,172,575 B2
(45) Date of Patent: Dec. 24, 2024

(54) DYNAMIC COMBUSTION ENGINE SOUND BROADCASTING DEVICE AND METHOD OF USE

(71) Applicant: Robert Linton, Meridian, ID (US)

(72) Inventor: Robert Linton, Meridian, ID (US)

( * ) Notice: Subject to any disclaimer, the term of this patent is extended or adjusted under 35 U.S.C. 154(b) by 62 days.

(21) Appl. No.: 18/087,224

(22) Filed: Dec. 22, 2022

(65) Prior Publication Data
US 2024/0208407 A1   Jun. 27, 2024

(51) Int. Cl.
*B60Q 5/00* (2006.01)
*G10K 15/02* (2006.01)

(52) U.S. Cl.
CPC ............. *B60Q 5/008* (2013.01); *G10K 15/02* (2013.01)

(58) Field of Classification Search
CPC ................................ B60Q 5/008; G10K 15/02
See application file for complete search history.

(56) References Cited

U.S. PATENT DOCUMENTS

| | | |
|---|---|---|
| 3,267,606 A | 8/1966 | Forbis |
| 5,314,372 A | 5/1994 | Kramer |
| 5,611,558 A | 3/1997 | Randmae |
| 6,589,097 B2 | 7/2003 | Smith |
| 2004/0116045 A1 | 6/2004 | Coleman |
| 2009/0319335 A1* | 12/2009 | Gates ................. G06Q 30/0252 705/7.29 |
| 2016/0082882 A1* | 3/2016 | Tsuzuki ................. G10K 15/02 340/425.5 |
| 2019/0009175 A1* | 1/2019 | Buxton ............... A63F 13/5255 |
| 2019/0359128 A1* | 11/2019 | Harper .................. G08G 1/163 |

FOREIGN PATENT DOCUMENTS

GB        2299199          3/1995

* cited by examiner

*Primary Examiner* — Mohamed Barakat
*Assistant Examiner* — Rufus C Point

(57) ABSTRACT

A dynamic combustion engine sound broadcasting device for making an electric motor vehicle (EMV) sound like an internal combustion engine vehicle (ICEV) includes an electronics module (EM), which is mountable to the EMV. The EM comprises a set of sensors and a digital to analog converter (DAC), which are operationally engaged to a computer. Each sensor is operationally engageable to a respective operating element of the EMV to measure a performance parameter and to generate an output signal. An algorithm on the computer pairs each output signal with an associated sound, corresponding to a sound produced by a respective mechanical element of a reference ICEV at a respective performance level, and generates a composite digital signal. The sounds are retained on the computer as digital audio signals in a plurality of data sets. The DAC converts the composite digital signal to an analog signal for broadcast by a speaker.

12 Claims, 4 Drawing Sheets

DYNAMIC COMBUSTION ENGINE SOUND BROADCASTING DEVICE AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sound broadcasting devices and more particularly pertains to a new sound broadcasting device for making an electric vehicle sound like an internal combustion engine vehicle.

(2) Description of Related Art Including Information Disclosed Under 37 CFR 1.97 and 1.98

The prior art relates to sound broadcasting devices, which include noise making devices for bicycles, which may emit sounds of a motorcycle. The prior art does not teach a sound broadcasting device wherein sensors attachable to operating elements of an electric motor vehicle produce output signals that are transmuted by a computer into sounds from a reference internal combustion engine vehicle and broadcast by a speaker.

BRIEF SUMMARY OF THE INVENTION

An embodiment of the disclosure meets the needs presented above by generally comprising an electronics module, which is configured to be mountable to an electric motor vehicle (EMV). The electronics module comprises a set of sensors and a digital to analog converter (DAC), which are operationally engaged to a computer. Each sensor is configured to be operationally engaged to a respective operating element of the EMV, to measure at least one performance parameter of the respective operating element, and to generate an output signal. A plurality of data sets and an algorithm are positioned on the computer. Each data set comprises a plurality of digital audio signals, with each digital audio signal corresponding to a sound produced by a respective mechanical element of a reference internal combustion engine vehicle (ICEV) at a respective performance level. The algorithm enables the computer to pair each output signal with an associated sound and to generate a composite digital signal from a plurality of output signals. The DAC is configured to convert the composite digital signal to an analog signal and is enabled to communicate the analog signal to a speaker for broadcast.

Another embodiment of the disclosure includes a dynamic combustion engine sound broadcasting system, which comprises a racing venue, a plurality of EMVs, a plurality of speakers, and a server. Each electronics module of a plurality of electronics modules, as described above, is mounted to a respective EMV. Each speaker is mounted in a respective position at the racing venue and comprises a receiver and a DAC. Programming code is positioned on the server and enables the server to amalgamate the composite digital signals that are received from the plurality of electronics modules. The programming code also enables the server to generate an amalgamated digital signal and to selectively communicate the amalgamated digital signal to a respective speaker, positioning the DAC of the respective speaker to generate an analog signal for broadcast.

Yet another embodiment of the disclosure includes a method of dynamically replicating the sound of an ICEV. The method entails providing an EMV, an electronics module, according to the disclosure above, and a speaker. Installation steps of the method are mounting the electronics module to the EMV, operationally attaching each sensor to its associated operating element, and mounting the speaker to the EMV. Operational steps of the method are operating the EMV and allowing the electronics module and the speaker to generate and to broadcast the analog signal, respectively.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
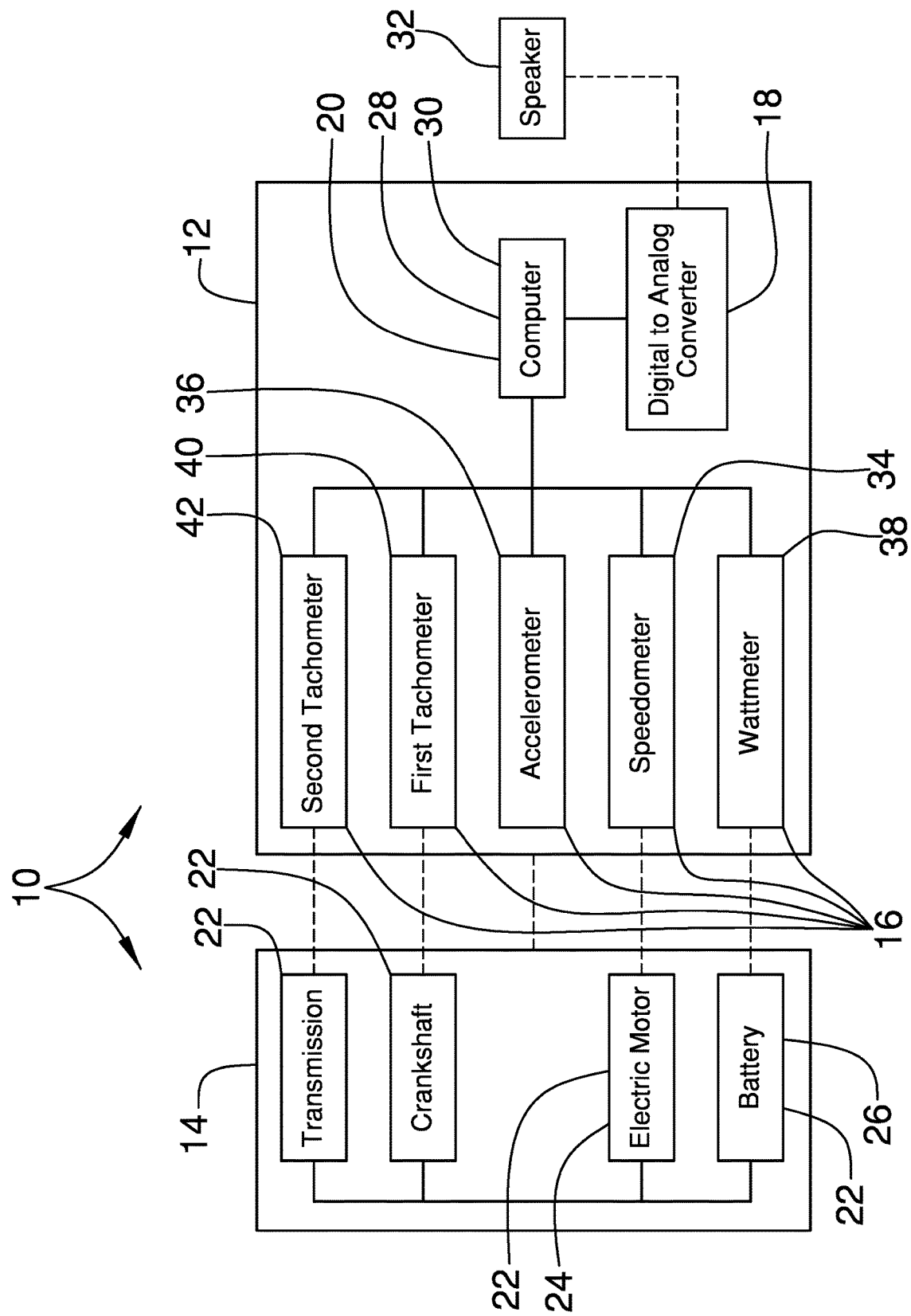
FIG. 1 is a block diagram a dynamic combustion engine sound broadcasting device according to an embodiment of the disclosure.

With reference now to the drawings, and in particular to FIGS. 1 through 4 thereof, a new sound broadcasting device embodying the principles and concepts of an embodiment of the disclosure and generally designated by the reference numeral 10 will be described.

As best illustrated in FIGS. 1 through 4, the dynamic combustion engine sound broadcasting device 10 generally comprises an electronics module 12, which is configured to be mountable to an electric motor vehicle (EMV) 14. The electronics module 12 comprises a set of sensors 16 and a digital to analog converter (DAC) 18, which are operationally engaged to a computer 20. Each sensor 16 is configured to be operationally engaged to a respective operating element 22 of the EMV 14, such as, but not limited to, a motor, 24 a battery 26, a transmission, a crankshaft, a brake, or the like. The sensor 16 is configured to measure at least one performance parameter of the respective operating element 22 and to generate an output signal.

A plurality of data sets 28 and an algorithm 30 are positioned on the computer 20. Each data set 28 comprises a plurality of digital audio signals, with each digital audio signal corresponding to a sound produced by a respective mechanical element of a reference internal combustion engine vehicle (ICEV) at a respective performance level. The algorithm 30 enables the computer 20 to pair each output signal with an associated sound and to generate a composite digital signal from a plurality of output signals. The DAC 18 is configured to convert the composite digital signal to an analog signal and is enabled to communicate the analog signal to a speaker 32 for broadcast.

In one configuration, as shown in the block diagram of FIG. 1, the speaker 32 is attached to the EMV 14. The present invention anticipates the speaker 32 being wiredly or wirelessly coupled to the DAC 18. A user might use such a configuration to dynamically replicate the sound of an ICEV that is comparable to an EMV 14 that they operate. As one example, which is in no way limiting, a user may operate an electric Ford Mustang, but prefer to have it sound like a classic Ford Mustang having what is described as a "throaty V8" sound. The dynamic combustion engine sound broadcasting device 10 would allow the user to perform this change in sound for their EMV 14.

One or more of the sensors 16 may be integral to the EMV 14. For example, the dynamic combustion engine sound broadcasting device 10 may utilize a speedometer 34 that is integral to the EMV 14. The set of sensors 16 comprises one or more of a speedometer 34, which is configured to measure a speed of the EMV 14, an accelerometer 36, which is configured to measure acceleration and deceleration of the EMV 14, a wattmeter 38, which is configured to measure the electric active power supplied by a battery 26 of the EMV 14, a first tachometer 40, which is configured to measure rotational speed of a crankshaft of the EMV 14, a second tachometer 42, which is configured to measure rotational speed of a transmission of the EMV 14 to assess engine braking via downshifting, or other sensing means, such as, but not limited to brake rotor sensors, torque sensors, and the like.

Figure 2:
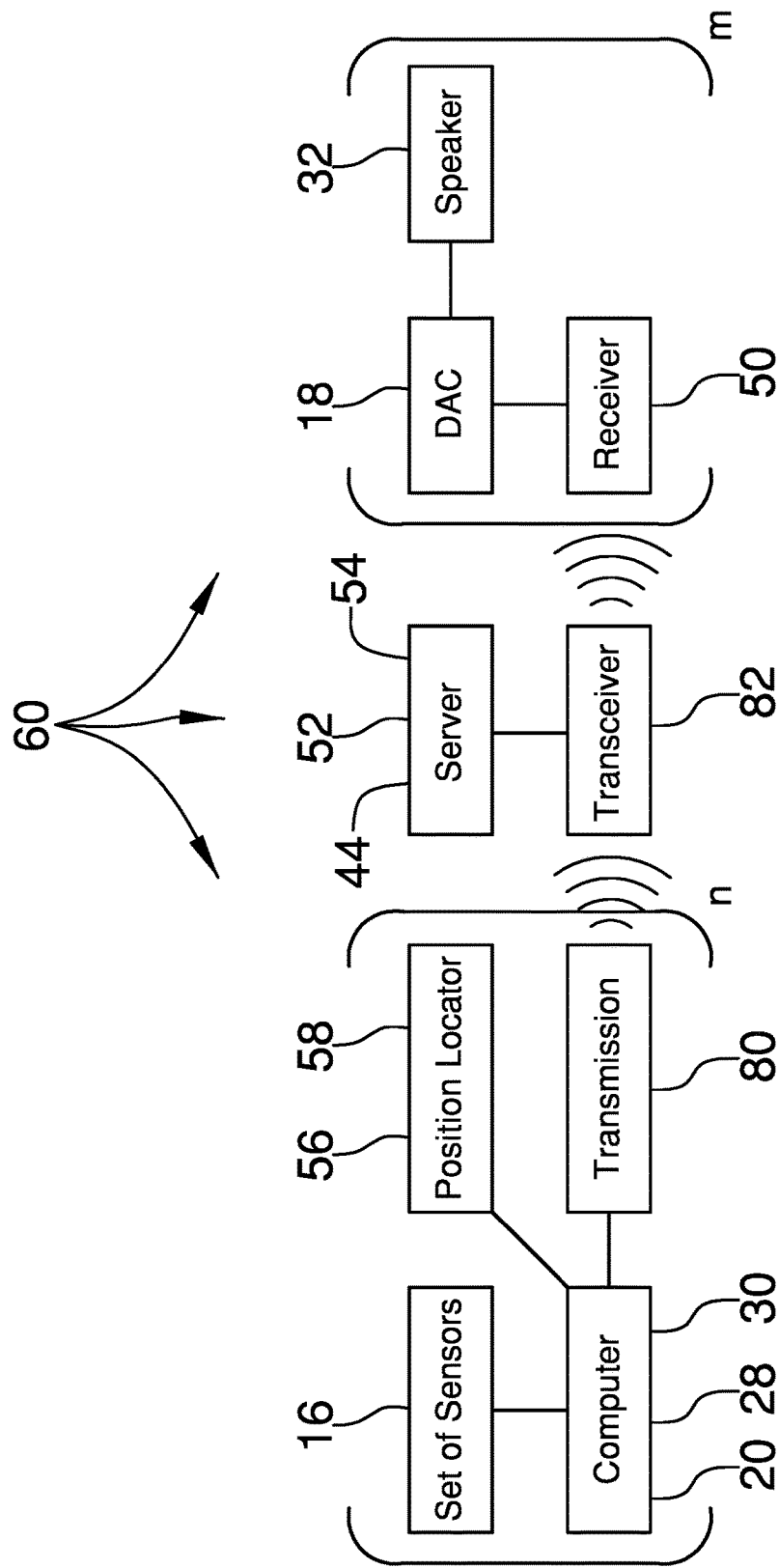
FIG. 2 is a block diagram a dynamic combustion engine sound broadcasting system.
Figure 3:
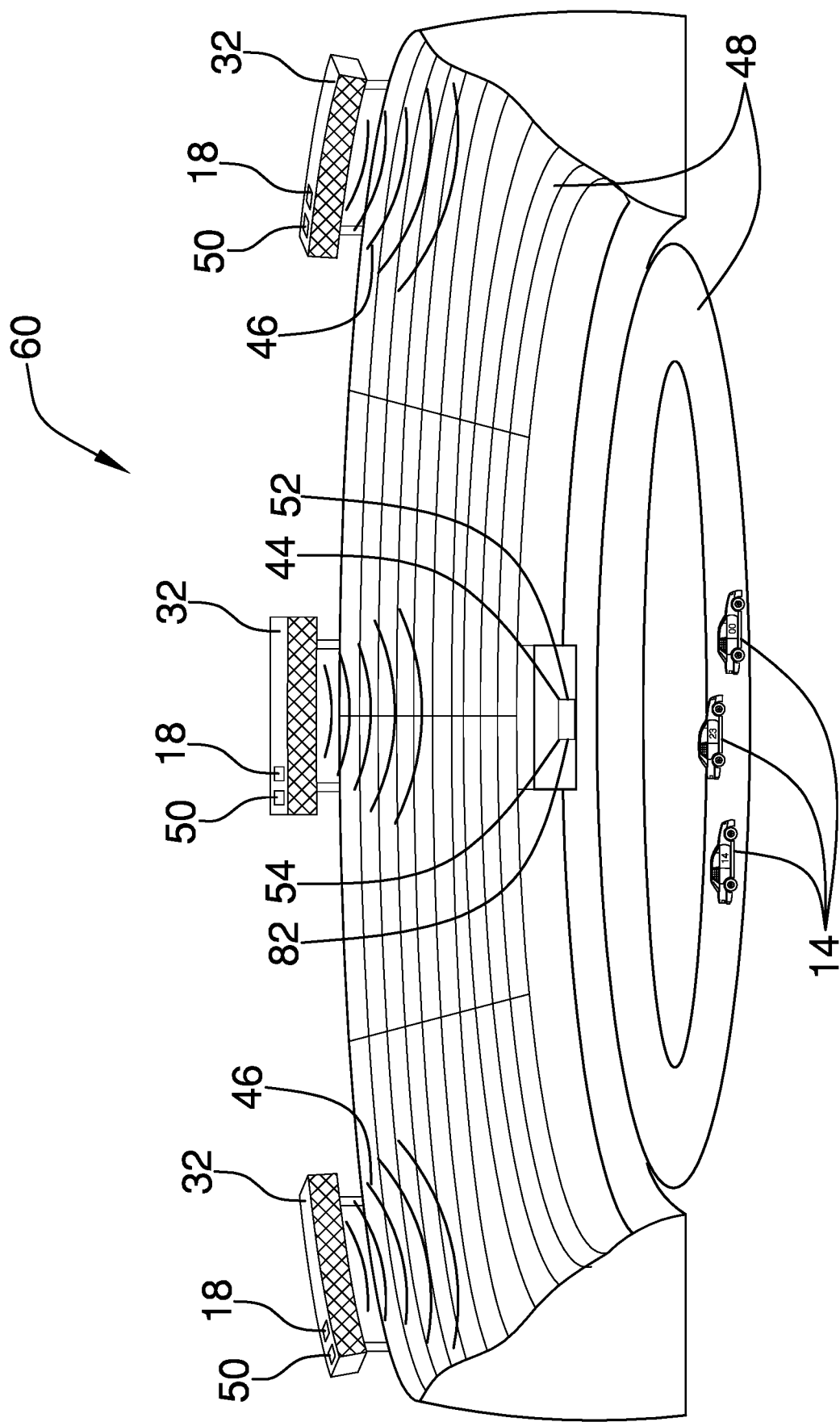
FIG. 3 is an in-use view of an embodiment of the disclosure.
Figure 4:
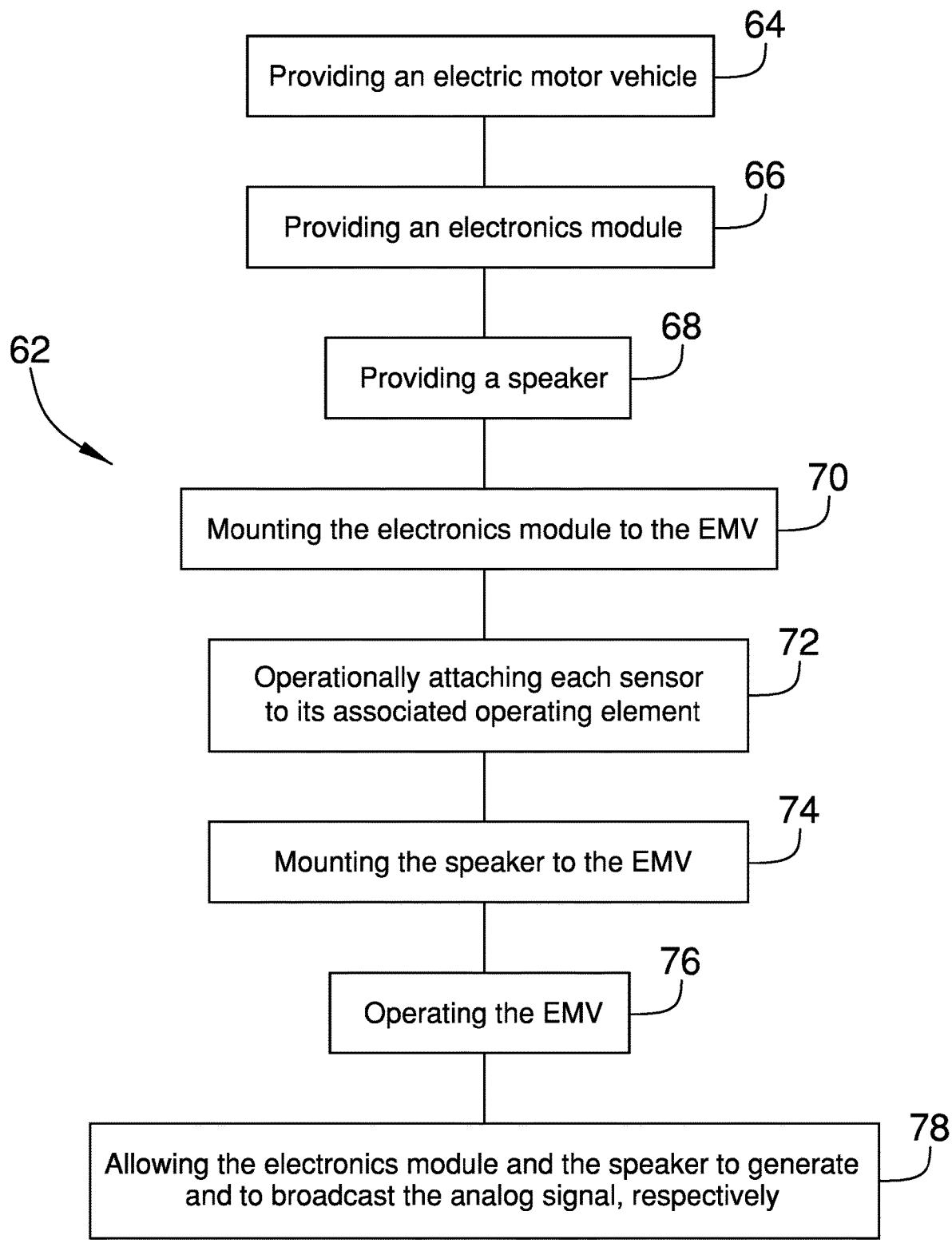
FIG. 4 is a flow diagram for a method utilizing an embodiment of the disclosure.

In another configuration, as shown in FIGS. 2 and 3, the electronics module 12 is one of a plurality of electronics modules 12, with each electronics module 12 comprising a transmitter 80 and that is configured to be mounted to a respective EMV 14 of a plurality of EMVs 14. Also in this configuration, the speaker 32 is one of a plurality of speakers 32 that is operationally engaged to the server 44. Each speaker 32 is configured to be mounted in a respective position 46 at a racing venue 48 and each speaker 32 comprises a receiver 50 and a DAC 18.

In this configuration, the dynamic combustion engine sound broadcasting device 10 comprises a server 44 to which is operationally engaged a signal transceiver 82 so that the server is in communicative engagement with the plurality of electronics modules 12 and the plurality of speakers 32. Programming code 52 is positioned on the server 44 and enables the server 44 to amalgamate the composite digital signals received from the plurality of electronics modules 12 to generate an amalgamated digital signal. The programming code 52 also enables the server 44 to selectively communicate the amalgamated digital signal to a respective speaker 32, positioning the DAC 18 of the respective speaker 32 to generate an analog signal for broadcast.

The present invention also anticipates software 54 being positioned on the server 44 which enables a user to modulate at least one aspect of the amalgamated digital signal. For example, the software 54 may enable the user to change a pitch, a frequency, a volume, or the like, of the amalgamated digital signal.

The present invention anticipates each electronics module 12 comprising a position locator 56, such as a Global Positioning System transceiver 58. The present invention also anticipates a location and a speed of each EMV 14 being determined by video monitoring. The programming code 52 enables the server 44 to alter each composite digital signal based on a location and speed of an associated EMV 14 relative to a respective speaker 32. The programming code 52 also enables the server 44 to generate a speaker-specific amalgamated digital signal from the composite digital signals that are received from the plurality of electronics modules 12. Therefore, an EMV 14 that is distal from the speaker 32 or moving more slowly will contribute to less to the speaker-specific amalgamated digital signal than a EMV 14 that is closer to the speaker 32 or traveling at a higher speed. Additionally, the programming code 52 enables the server 44 to alter each composite digital signal based on change in location of the EMV 14 to create Doppler shifting for each composite digital signal.

The present invention anticipates a dynamic combustion engine sound broadcasting system 60, which comprises a racing venue 48 and a plurality of EMVs 14, as shown in FIG. 3. Each electronics module 12 of a plurality of electronics modules 12 is mounted to a respective EMV 14 and comprises a set of sensors 16, a transmitter 80, and a computer 20, upon which a plurality of data sets 28 and an algorithm 30 are positioned, per the specification above.

The dynamic combustion engine sound broadcasting system 60 also comprises a plurality of speakers 32 and a server 44, which is in communicative engagement with the plurality of electronics modules 12 and the plurality of speakers 32. Each speaker 32 is mounted in a respective position 46 at the racing venue 48 and comprises a receiver 50 and a DAC 18. Programming code 52 is positioned on the server 44 and enables the server 44 to amalgamate the composite digital signals that are received from the plurality of electronics modules 12. The programming code 52 also enables the server 44 to generate an amalgamated digital signal and to selectively communicate the amalgamated digital signal to a respective speaker 32, positioning the DAC 18 of the respective speaker 32 to generate an analog signal for broadcast.

The present invention also anticipates the speakers 32 of the dynamic combustion engine sound broadcasting system 60 being wiredly coupled to the server 44 and the server 44 having a separate DAC 18 for each speaker 32. Software 54 may be positioned on the server 44 that enables a user to modulate at least one aspect of the amalgamated digital signal, as described above.

Each electronics module 12 of the dynamic combustion engine sound broadcasting system 60 also may comprise a position locator 56. The programming code 52 may enable the server 44 to alter each composite digital signal based on a location and speed of an associated EMV 14 relative to a respective speaker 32 and to generate a speaker-specific amalgamated digital signal from the composite digital signals received from the plurality of electronics modules 12.

The dynamic combustion engine sound broadcasting system 60 also could be interfaced with audiovisual broadcast systems, allowing the audiovisual broadcast systems to utilize the speaker-specific amalgamated digital signals based on locations of respective cameras at the racing venue 48.

In use, the dynamic combustion engine sound broadcasting device 10 enables a method of dynamically replicating the sound of an internal combustion engine vehicle 62. The method 62 comprises a first provision step 64 of providing EMV 14. A second provision step 66 of the method 62 is providing an electronics module 12, according to the specification above. A third provision step 68 of the method 62 is providing a speaker 32. A first installation step 70 of the method 62 is mounting the electronics module 12 to the EMV 14. A second installation step 72 of the method 62 is operationally attaching each sensor 16 to its associated operating element 22. A third installation 74 step of the method 62 is mounting the speaker 32 to the EMV 14 so that the speaker 32 is in communicative engagement with the DAC 18. A first operational step 76 of the method 62 is operating the EMV 14. A second operational step 78 of the method 62 is allowing the electronics module 12 and the speaker 32 to generate and to broadcast the analog signal, respectively.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dynamic combustion engine sound broadcasting device comprising:

an electronics module configured to be mountable to an electric motor vehicle (EMV), the electronics module comprising:
  a set of sensors, each sensor being configured for operationally engagement to a respective operating element of the EMV, for measuring at least one performance parameter of the respective operating element, and for generating an output signal,
  a computer operationally engaged to the set of sensors,
  a plurality of data sets positioned on the computer, each data set comprising a plurality of digital audio signals, each digital audio signal corresponding to a sound produced by a respective mechanical element of a reference internal combustion engine vehicle (ICEV) at a respective performance level,
  an algorithm positioned on the computer for pairing each output signal with an associated sound and for generating a composite digital signal from a plurality of output signals, and
  a digital to analog converter (DAC) operationally engaged to the computer and being configured for converting the composite digital signal to an analog signal; and
a speaker in communicative engagement with the DAC, such that the DAC is enabled for communicating the analog signal to the speaker for broadcast;
the electronics module being one of a plurality of electronics modules, each electronics module comprising a transmitter and being configured to be mounted to a respective EMV of a plurality of EMVs;
the speaker being one of a plurality of speakers, each speaker being configured for mounting in a respective position at a racing venue, each speaker comprising a receiver and a DAC;
a server;
a signal transceiver operationally engaged to the server, such that the server is in communicative engagement with the plurality of electronics modules and the plurality of speakers; and
the server being configured for amalgamating the composite digital signals received from the plurality of electronics modules to generate an amalgamated digital signal simulating sounds of multiple combustion vehicles within a racing venue, the server selectively communicating the amalgamated digital signal to a respective speaker whereby broadcast of the amalgamated digital signal simulates the sounds of multiple combustion vehicles within the racing venue.

2. The dynamic combustion engine sound broadcasting device of claim 1, wherein the speaker is attached to the EMV.

3. The dynamic combustion engine sound broadcasting device of claim 1, wherein one or more of the sensors is integral to the EMV.

4. The dynamic combustion engine sound broadcasting device of claim 1, wherein the set of sensors comprises one or more of:
  a speedometer configured for measuring a speed of the EMV;
  an accelerometer configured for measuring acceleration and deceleration of the EMV;
  a wattmeter configured for measuring the electric active power supplied by a battery of the EMV;
  a first tachometer configured for measuring rotational speed of a crankshaft of the EMV; and
  a second tachometer configured for measuring rotational speed of a transmission of the EMV.

5. The dynamic combustion engine sound broadcasting device of claim 1, further including
the DAC of the respective speaker generating an analog signal for broadcast.

6. The dynamic combustion engine sound broadcasting device of claim 1, further including:
each electronics module comprising a position locator; and
the server altering each composite digital signal based on a location and speed of an associated EMV relative to a respective speaker and generating a speaker specific amalgamated digital signal from the composite digital signals received from the plurality of electronics modules.

7. The dynamic combustion engine sound broadcasting device of claim 6, wherein the position locator comprises a Global Positioning System transceiver.

8. A dynamic combustion engine sound broadcasting system comprising:
a racing venue;
a plurality of electric motor vehicles (EMVs);
a plurality of electronics modules, each electronics module being mounted to a respective EMV and comprising:
a set of sensors, each sensor being operationally engaged to a respective operating element of the EMV and configured for measuring at least one performance parameter of the respective operating element and for generating an output signal,
a computer operationally engaged to the set of sensors,
a plurality of data sets positioned on the computer, each data set comprising a plurality of digital audio signals, each digital audio signal corresponding to a sound produced by a respective mechanical element of a reference internal combustion engine vehicle (ICEV) at a respective performance level,
an algorithm positioned on the computer for pairing each output signal with an associated sound and for generating a composite digital signal from a plurality of output signals, and
a transmitter operationally engaged to the computer;
a plurality of speakers, each speaker being mounted in a respective position at the racing venue, each speaker comprising a receiver and a digital to analog converter (DAC);
a server;
a signal transceiver operationally engaged to the server, such that the server is in communicative engagement with the plurality of electronics modules and the plurality of speakers; and
the server being configured for amalgamating the composite digital signals received from the plurality of electronics modules to generate an amalgamated digital signal, the server selectively communicating the amalgamated digital signal to a respective speaker whereby broadcast of the amalgamated digital signal simulates the sounds of multiple combustion vehicles within the racing venue wherein the DAC of the respective speaker generates an analog signal for broadcast.

9. The dynamic combustion engine sound broadcasting system of claim 8, wherein;
each electronics module comprises a position locator; and
the programming code enables the server to alter each composite digital signal based on a location and speed of an associated EMV relative to a respective speaker and to generate a speaker specific amalgamated digital signal from the composite digital signals received from the plurality of electronics modules.

10. The dynamic combustion engine sound broadcasting system of claim 9, wherein the position locator comprises a Global Positioning System transceiver.

11. The dynamic combustion engine sound broadcasting system of claim 8, wherein the set of sensors comprises one or more of:
a speedometer configured for measuring a speed of the EMV;
an accelerometer configured for measuring acceleration and deceleration of the EMV;
a wattmeter configured for measuring the electric active power supplied by a battery of the EMV;
a first tachometer configured for measuring rotational speed of a crankshaft of the EMV; and
a second tachometer configured for measuring rotational speed of a transmission of the EMV.

12. A method of dynamically replicating the sound of multiple internal combustion engine vehicles when racing electric motor vehicles, comprising the steps of:
providing a plurality of electric motor vehicles;
providing a plurality of electronics modules each configured to be mountable to a respective EMV, each electronics module comprising:
a set of sensors, each sensor being configured for operationally engagement to a respective operating element of the EMV, for measuring at least one performance parameter of the respective operating element, and for generating an output signal,
a computer operationally engaged to the set of sensors,
a plurality of data sets positioned on the computer, each data set comprising a plurality of digital audio signals, each digital audio signal corresponding to a sound produced by a respective mechanical element of a reference internal combustion engine vehicle at a respective performance level,
an algorithm positioned on the computer for pairing each output signal with an associated sound and for generating a composite digital signal from a plurality of output signals such that the composite digital signal simulates sounds produced by action of the EMV as if it has a combustion engine, and
a digital to analog converter (DAC) operationally engaged to the computer and being configured for converting the composite digital signal to an analog signal;
providing a speaker;
operationally attaching each sensor to its associated operating element;
operating each EMV; and
broadcasting sounds produced by action of each EMV through the speaker wherein the sounds simulate racing of combustion engine vehicles from the action of the EMVs.

* * * * *